March 7, 1933. M. NUBERG 1,900,460
JOINT CONSTRUCTION
Filed March 12, 1931
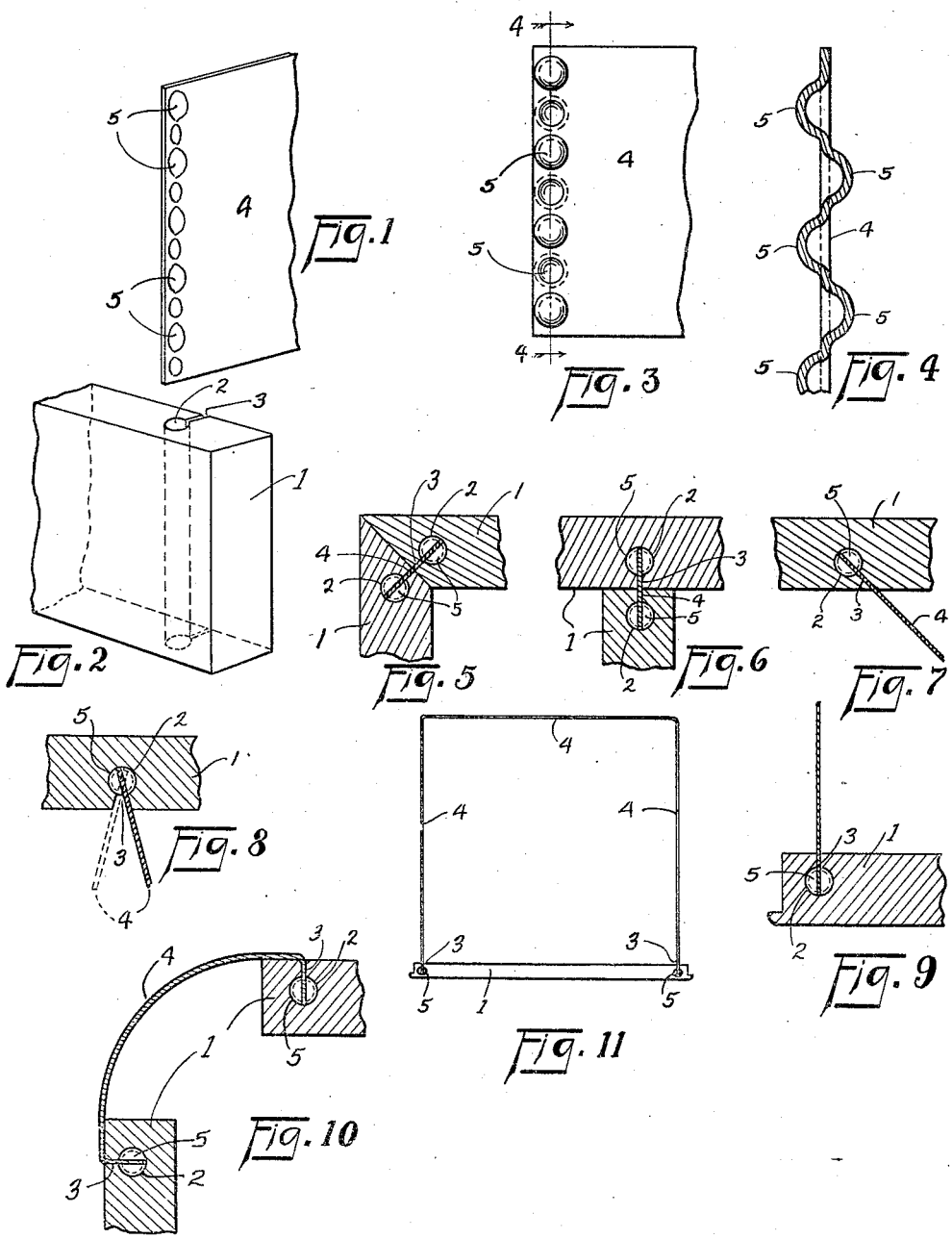
Inventor
MATTHYS NUBERG Patented Mar. 7, 1933

1,900,460

UNITED STATES PATENT OFFICE

MATTHYS NUBERG, OF GRAND RAPIDS, MICHIGAN, ASSIGNOR TO AMERICAN SEATING COMPANY, OF GRAND RAPIDS, MICHIGAN, A CORPORATION OF NEW JERSEY

JOINT CONSTRUCTION

Application filed March 12, 1931. Serial No. 521,984.

The present invention relates to joint constructions and more particularly to a method of joining non-metal and metal members together.

The main objects of the invention are to provide a novel method of securing non-metal and metal members together; to provide a novel joint construction; and to provide a convenient method for readily securing metal and non-metal members together.

An illustrative embodiment of the invention is shown in the accompanying drawing wherein:

Figure 1 is a fragmentary perspective view of a metal member used in the novel joint construction;

Figure 2 is a fragmentary perspective view of a non-metal member used in the novel joint construction;

Figure 3 is a fragmentary plan view of the metal member;

Figure 4 is a sectional view taken on line 4—4 of Figure 3;

Figures 5 to 10 inclusive show some of the many different ways in which the novel joint construction may be utilized; and Figure 11 is a top plan view of a drawer employing the novel joint construction in which the front portion is of wood and the remainder thereof is of metal.

Referring to the drawing in which like numerals designate the same parts in the several views, a non-metal member 1 of wood, composition or the like is provided with a bore 2 from which extends a slit 3 to the outer surface thereof. The bore 2 is here shown as circular although it will be understood that it may be squared, hexagonal or of any other desired shape. The slit 3 is likewise here shown as extending the entire length of the bore, but it will be obvious that certain constructions may require that the slit extend only a partial length relative to the length of the bore.

A metal member 4 is provided with a series of alinged alternate oppositely disposed semispherical raised or struck up portions 5 adjacent one marginal edge thereof. The overall width of the oppositely disposed raised portions is slightly greater than the diameter of the bore. It will be understood however, that if the bore is squared, hexagonal or of a shape other than circular, the struck up portions 5 should be made to conform to such shape as will be readily apparent to those skilled in the die making art. Nor is it essential that the raised or struck up portions be alternately and oppositely disposed; they may be disposed on one side of the metal member adjacent one of its marginal edges.

In assembling the parts, the raised portions of the metal member are inserted in the bore and forcibly slid therein to make a metal-non-metal joint of the character illustrated in Figures 5-11 inclusive.

It will thus be seen that a novel method of joining metal-non-metal parts together is herein shown and described and that a novel metal-non-metal joint can be readily and conveniently effected.

While but one specific embodiment of this invention has been herein shown and described, it will be understood that numerous details of the construction shown may be altered or omitted without departing from the spirit of this invention as defined by the following claims.

I claim:

1. In a construction of the class described, a non-metal member provided with a bore and a slit extending therefrom to the outer surface of said member, a metal member having a series of raised semi-spherical portions, said raised portions conforming to the shape of the bore but of slightly greater overall width than that of the bore, said raised portions being adapted to be forcibly slid into said bore to form a metal-non-metal joint.

2. In a construction of the class described, a non-metal member provided with a bore and a slit extending therefrom to the outer surface of said member, a metal member having a series of raised semi-spherical portions adjacent one marginal edge thereof, said raised portions conforming to the shape of the bore but of slightly greater overall width than that of the bore and adapted to be forcibly slid into said bore to form a metal-non-metal joint.

3. In a construction of the class described, a non-metal member provided with a bore and a slit extending therefrom to the outer surface of said member, a metal member having a series of alternate oppositely disposed raised semi-spherical portions adjacent one marginal edge thereof, said raised portions conforming to the shape of the bore but of slightly greater overall width than that of the bore and adapted to be forcibly slid into said bore to form a metal-non-metal joint.

4. In a construction of the class described, a non-metal member provided with a circular bore and a slit extending therefrom to the outer surface of said member, a metal member having a series of semi-spherical raised portions adjacent one marginal edge thereof disposed on opposite sides in staggered relation, said raised portions being of slightly greater overall width than that of the bore and adapted to be forcibly slid into said bore to form a metal-non-metal joint.

5. In a construction of the class described, a member provided with a circular bore and a slit extending therefrom to the outer surface of said member, a second member having a series of spaced aligned semi-spherical struck up portions disposed in opposite sides thereof in staggered relation whose overall width is slightly greater than the diameter of the bore, said struck up portions being adapted to be forcibly slid into said bore to form a joint.

6. In a construction of the class described, a non-metal member provided with a bore and a slit extending therefrom to the outer surface of said member, a springable metallic plate having on its opposite sides a series of struck up portions spaced in alignment, said portions on one side of the plate being in staggered relation with said portions on the opposite side of the plate, the parallelly disposed lines extending through the summits of said portions on the opposite sides respectively of the plate being spaced apart farther than the opposite sides of the bore engaged by said portions, so that the plate when driven into the bore is sprung undulatedly in a plane perpendicular to the plate in the direction of said series.

In testimony whereof I have hereunto set my hand at Grand Rapids, Michigan, this 9th day of March, 1931.

MATTHYS NUBERG.